United States Patent [19]

Fleck

[11] Patent Number: 5,432,020
[45] Date of Patent: Jul. 11, 1995

[54] PROCESS AND APPARATUS FOR HUMIDIFYING PROCESS GAS FOR OPERATING FUEL CELL SYSTEMS

[75] Inventor: Wolfram fleck, Erbach; Uwe Benz, Uhldingen; Gerald Hornburg, Tettnang; all of Germany

[73] Assignee: Daimler-Benz AG, Germany

[21] Appl. No.: 257,328

[22] Filed: Jun. 7, 1994

[30] Foreign Application Priority Data

Jun. 7, 1993 [DE] Germany ............ 43 18 818.4

[51] Int. Cl.6 .............................................. H01M 8/04
[52] U.S. Cl. ........................................ 429/13; 429/19; 429/34
[58] Field of Search ............... 429/12, 13, 14, 17, 429/19, 34, 38, 39

[56] References Cited

U.S. PATENT DOCUMENTS

| | | | |
|---|---|---|---|
| 3,507,702 | 4/1970 | Sanderson | 429/24 |
| 4,738,903 | 4/1988 | Garow et al. | |
| 5,079,105 | 1/1992 | Bossell | 429/19 |
| 5,151,334 | 9/1992 | Fushimi et al. | 429/32 |
| 5,360,679 | 11/1994 | Buswell et al. | 429/19 |

FOREIGN PATENT DOCUMENTS

| | | |
|---|---|---|
| 0184541 | 6/1986 | European Pat. Off. |
| 2604966 | 8/1976 | Germany |
| 4021097 | 1/1992 | Germany |
| 4032993 | 5/1992 | Germany |
| 4201795 | 7/1993 | Germany |

Primary Examiner—Anthony Skapars
Attorney, Agent, or Firm—Evenson, McKeown, Edwards & Lenahan

[57] ABSTRACT

A process and an apparatus humidify process gas for operating fuel cell systems. To ensure high efficiency, the process gas must be introduced at a predetermined temperature and humidity. A metered quantity of fine water droplets is injected into the gas supply line, by way of which the process air is humidified. If the fuel cell is operated under pressure, the process air generally has to be cooled after it has been compressed. The process air is automatically cooled as a result of a partial evaporation of the water droplets while the residual quantity of water in the form of droplets is introduced into the fuel cell.

7 Claims, 1 Drawing Sheet

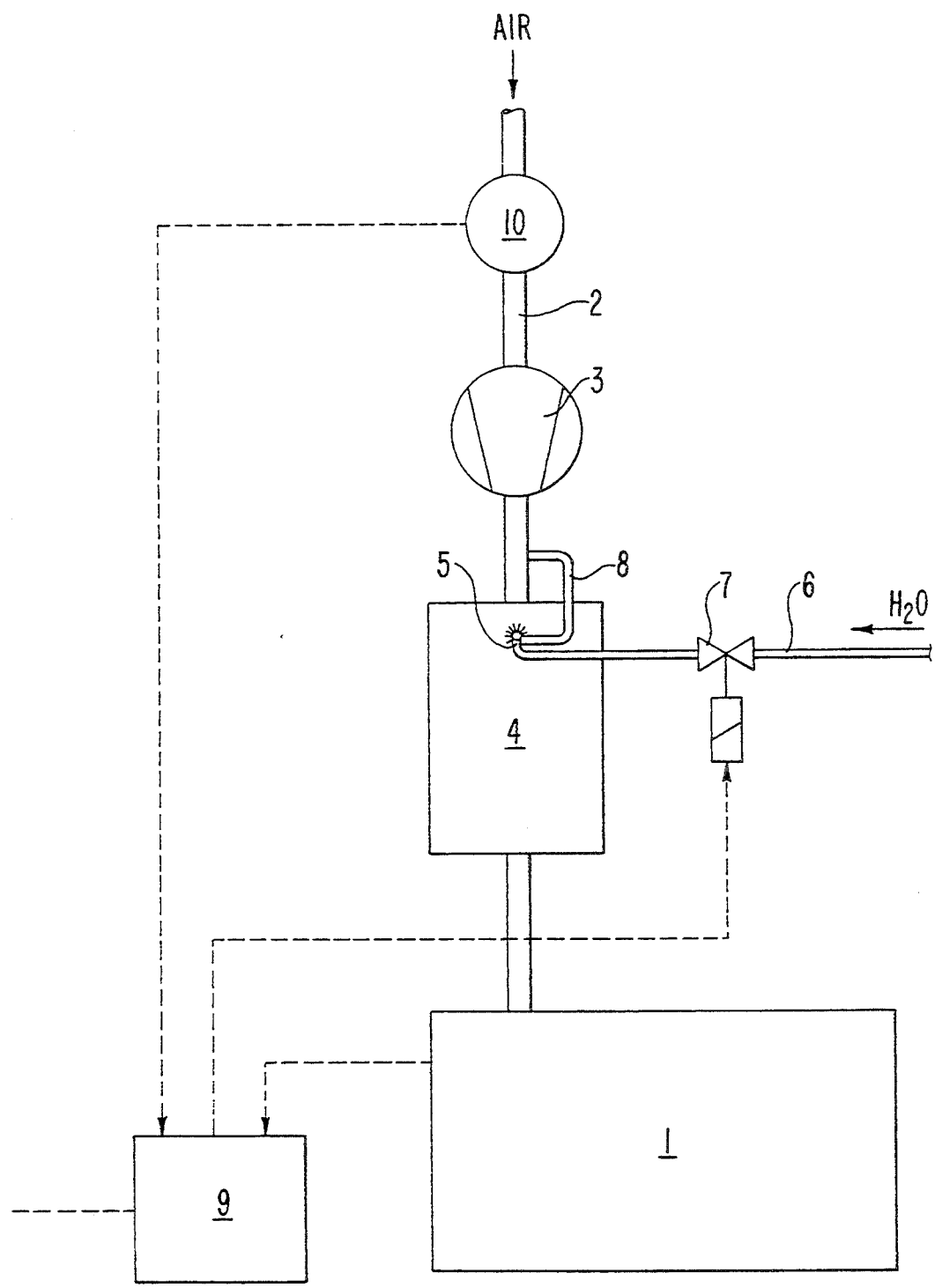

5,432,020

PROCESS AND APPARATUS FOR HUMIDIFYING PROCESS GAS FOR OPERATING FUEL CELL SYSTEMS

CROSS-REFERENCE TO RELATED APPLICATION

This application is related to a co-pending application Ser. No. 08/257,325, filed Jun. 7, 1994 filed in the name of Uwe Benz et al. for PROCESS AND APPARATUS FOR SUPPLYING AIR TO A FUEL CELL SYSTEM

BACKGROUND AND SUMMARY OF THE INVENTION

The present invention concerns a process and an apparatus for humidifying process gas for operating fuel cell systems.

To avoid a drying-out of the electrolyte membrane, fuel cells, especially those with proton-conducting electrolyte membranes (PEM cells), require that the process gases, i.e., the air and the combustible gas, be humidified. Conventional processes humidify the gases by a so-called bubbling bath, via contact with wetted walls (falling film), via granular-bed columns, or by spraying in steam. U.S. Pat. No. 4,738,903, for example, discusses a fuel cell system which introduces water vapor into the anode gas. The disadvantage of these humidifier units is that they are relatively large, their dynamic controllability is inadequate, and they cannot be protected against freezing.

An object of the present invention is to provide a process and a device, by way of which it is possible to set the humidity of the process air prior to its entering the fuel cell to a desired value which is predetermined as a function of the operating parameters.

This object has been achieved according to the present invention by injecting a certain metered quantity of finely atomized water into the process gas before the latter enters the fuel cell.

Injection makes it possible to accurately dose the quantity of water to be added, thereby allowing for accurate adjustment of the humidity of the process gases. By using rapidly operating magnetic valves for dosing, it is also possible to ensure a highly dynamic adjustment to altered loads. Water injection can be used both for humidifying the process air and for humidifying the combustible gas such as, for example, hydrogen.

Process gases, in particular process air, are compressed by a compressor prior to their entering the fuel cell. Since the temperature of the process air increases while it is being compressed, the water droplets injected into the air supply line are partially evaporated to remove the heat of evaporation from the compressed process air. This leads to the additional advantage that the process air is simultaneously cooled by the injected water, as a result of which there is no need for an additional air-cooling system.

If the energy of the compressed air is not sufficiently high to evaporate the entire quantity of water required for humidification, the water droplets, forming an aerosol air jet, are transported into the fuel cell. To prevent the water droplets precipitating along the inlet cross-sections of the gas-conducting channels in the fuel cell, the cross-section of the droplets must be smaller than the inlet cross-section of the gas-conducting channels.

BRIEF DESCRIPTION OF THE DRAWING

These and other objects, features and advantages of the present invention will become more readily apparent from the following detailed description thereof when taken in conjunction with the accompanying sole figure which schematically depicts an air supply unit according to the present invention for a fuel cell system.

DETAILED DESCRIPTION OF THE DRAWING

Although only the humidification of process air is hereinafter described, the process and the apparatus can also be used to humidify the combustible gas or applied to a different gaseous oxidation agent.

The fuel cell system consists of a fuel cell 1 or a stack of fuel cells which is supplied via an air supply line 2 with process air. A known air discharge line and combustible gas system, with which fuel cell 1 is supplied with combustible gas such as, for example, hydrogen, are not shown so as not to obscure the basic features of the present invention. During the reaction in the fuel cell 1 of the hydrogen with the oxygen which is contained in the process air, product water and heat of reaction are generated in addition to electrical energy. The product water and heat of reaction are largely discharged from fuel cell 1 along with the process air. At the same time, as the air volume flow leaves fuel cell 1, it is reduced by the quantity of oxygen consumed.

A compressor 3 for compressing the process air and a mixing chamber 4 are located in the air supply line 2. The mixing chamber 4 contains an injection nozzle 5 which is connected via a supply line 6 to a water storage container (not shown). To meter the quantity to be injected, a magnetic valve 7 is positioned in the supply-line 6. The quantity of water is adjusted directly via the quantity flowing through or, in the case of a clocked magnetic valve, by the clocked frequency and the closing time per interval. In addition, a mechanical flow divider may also be used.

The water is injected in the form of fine droplets into the air supply line 2 via the injection nozzle 5. The water can be atomized by, for example, an ultrasound atomizer or, as shown, by an air-supported injection nozzle 5. The air required for atomization is supplied via line 8 which branches off air supply line 2 upstream of mixing chamber 4. The magnetic valve is triggered via a control device 9, in which a desired value for the quantity of water to be added is determined as a function of the relevant operating parameters. The desired value is determined as a function of the air volume flow that is measured by a sensor 10 which is located in the air supply line 2. In addition, the air temperature or other parameters that are specific to fuel cells may be entered for determination of the desired value.

To ensure an adequate efficiency, the process air must have, on entering the fuel cell, a predetermined temperature and a predetermined humidity. Thus, to adjust the humidity, an air humidifier is generally placed into the air supply line 2. Since the temperature of the process air increases up to 150° C. after it has passed through condenser 3, it may be necessary to provide for an additional boost intercooling system. Since at least a portion of the water droplets evaporate in this hot process air and thus removes the heat of evaporation from the process air, the temperature of the process air is reduced at least to the point that an additional boost intercooling system can be eliminated. In general, however, the energy contained in the process air will not suffice to evaporate the entire quantity of water that is necessary for humidifying the process air. Thus, part of the water must be transported in the liquid phase. The maximum admissible droplet size is determined by the geometry of the gas-conducting channels of the fuel cell. To ensure that the droplets pass through the narrow channels and do not clog the cross-sections as they enter these channels, they should have a diameter in a range between 5 and 15 $\mu$m.

The mixing chamber 4 may be located upstream or downstream of compressor 3. If the water is injected upstream of the compressor 3, the compressor output is reduced by 6–8%. In this embodiment, the energy resulting during compression is removed from the gas directly in the form of heat of evaporation. In the case of water injection downstream of the compressor 3, the gas temperature during polytropic compression is first increased and only subsequently decreased as a result of the fact that the heat of evaporation is removed.

Since fuel cells are susceptible to impurities, only the purest type of water available should generally be used to humidify the gas. In addition, a large portion of the construction volume in the well-known humidifier units is constantly filled with water which has made it almost impossible to protect the system against damage from freezing. This is very important, especially in the case of mobile applications, for example, in automotive vehicles. In the device of the present invention, protection against freezing is more readily possible since only the storage container and the supply line 6 are continuously filled with pure water. These relatively small structural units, however, can be protected against damage due to freezing by providing suitable insulating measures or by a heating system. In addition, the gas-conducting channels in fuel cell 1 are not completely filled with water, thus ensuring that, in the event of freezing, fuel cell 1 will not be damaged.

Compared to the conventional systems, therefore, the humidifier system of the present invention requires considerably less space for humidifying the process gases of fuel cells 1. In addition, the quantity of water added can be adjusted very rapidly to dynamic load changes.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A process for humidifying process gas for operating fuel cells, comprising the step of injecting a metered quantity of finely atomized water into the process gas before the process gas enters into a supply line for supplying the fuel cell.

2. The process according to claim 1, wherein the metered quantity of injected water is determined as a function of operating conditions.

3. The process according to claim 1, wherein the injected water has droplets with a diameter smaller than a diameter of gas-conducting channels in the fuel cell.

4. The process according to claim 1, wherein the fuel cell is an air-breathing fuel cell, and the process air is humidified.

5. An apparatus for humidifying process gas for an operating fuel cell, comprising a supply line for supplying process gas to the fuel cell, and a device for injecting a metered quantity of finely atomized water is arranged in the supply line before the process gas enters the fuel cell.

6. The device according to claim 5, wherein the device includes a water atomizer.

7. The device according to claim 5, wherein the device includes a water atomizer configured as one of an air-supported injection nozzle apparatus and an ultrasound atomizer apparatus.

* * * * *